(12) United States Patent
Paniccia et al.

(10) Patent No.: US 11,656,081 B2
(45) Date of Patent: May 23, 2023

(54) INTEGRATED PHOTONICS OPTICAL GYROSCOPES OPTIMIZED FOR AUTONOMOUS TERRESTRIAL AND AERIAL VEHICLES

(71) Applicant: Anello Photonics, Inc., Santa Clara, CA (US)

(72) Inventors: Mario Paniccia, Santa Clara, CA (US); Qing Tan, Santa Clara, CA (US); Mike Horton, Santa Clara, CA (US)

(73) Assignee: Anello Photonics, Inc., Santa Clara, CA (US)

( * ) Notice: Subject to any disclaimer, the term of this patent is extended or adjusted under 35 U.S.C. 154(b) by 0 days.

(21) Appl. No.: 17/071,697

(22) Filed: Oct. 15, 2020

(65) Prior Publication Data

US 2021/0116246 A1 Apr. 22, 2021

Related U.S. Application Data

(60) Provisional application No. 62/923,234, filed on Oct. 18, 2019.

(51) Int. Cl.
*G01C 19/72* (2006.01)
*G02B 6/12* (2006.01)
*G02B 6/293* (2006.01)

(52) U.S. Cl.
CPC ......... *G01C 19/727* (2013.01); *G01C 19/722* (2013.01); *G01C 19/728* (2013.01);
(Continued)

(58) Field of Classification Search
CPC ............ G02B 6/12007; G02B 6/29338; G02B 2006/12138; G01C 19/727; G01C 19/722; G01C 19/728
See application file for complete search history.

(56) References Cited

U.S. PATENT DOCUMENTS 4,315,693 A * 2/1982 Walker .................. G01C 21/16
356/470
4,588,296 A * 5/1986 Cahill .................. G01C 19/726
359/287

(Continued)

FOREIGN PATENT DOCUMENTS

CN 1869630 A * 11/2006
CN 1945210 A * 4/2007
(Continued)

OTHER PUBLICATIONS

Curey et al., CSDL-P-127 Proposed IEEE Inertial Systems Terminology Standard and Other Inertial Sensor Standards, IEEE 2004 (Year: 2004).*

(Continued)

*Primary Examiner* — Peter Radkowski
(74) *Attorney, Agent, or Firm* — Lowenstein Sandler LLP; Madhumita Datta

(57) ABSTRACT

Novel small-footprint integrated photonics optical gyroscopes disclosed herein can provide ARW in the range of 0.05°/√Hr or below (e.g. as low as 0.02°/√Hr), which makes them comparable to fiber optic gyroscopes (FOGs) in terms of performance, at a much lower cost. The low bias stability value in the integrated photonics optical gyroscope corresponds to a low bias estimation error (in the range of 1.5°/Hr or even lower) that is crucial for safety-critical applications, such as calculating heading for autonomous vehicles, drones, aircrafts etc. The integrated photonics optical gyroscopes may be co-packaged with mechanical gyroscopes into a hybrid inertial measurement unit (IMU) to provide high-precision angular measurement for one or more axes.

22 Claims, 9 Drawing Sheets

(52) U.S. Cl.
CPC ...... *G02B 6/12007* (2013.01); *G02B 6/29338* (2013.01); *G02B 2006/12138* (2013.01)

(56) References Cited

U.S. PATENT DOCUMENTS

| | | | | |
|---|---|---|---|---|
| 5,327,215 | A * | 7/1994 | Bernard | |
| 5,517,204 | A * | 5/1996 | Murakoshi | H01Q 1/18 74/5.34 |
| 5,645,077 | A * | 7/1997 | Foxlin | |
| 6,209,383 | B1 * | 4/2001 | Mueller | G01C 25/005 73/1.37 |
| 6,259,089 | B1 * | 7/2001 | Vali | |
| 6,577,929 | B2 * | 6/2003 | Johnson | B64G 1/36 701/4 |
| 6,834,234 | B2 * | 12/2004 | Scherzinger | G01S 19/49 701/468 |
| 7,106,448 | B1 * | 9/2006 | Vawter | G01C 19/72 356/461 |
| 7,957,898 | B2 * | 6/2011 | Hoshizaki | G01C 21/16 701/480 |
| 8,031,343 | B2 * | 10/2011 | Carothers | G01C 19/72 356/461 |
| 8,068,232 | B2 * | 11/2011 | Terrel | G01C 19/721 356/461 |
| 8,082,099 | B2 * | 12/2011 | Latif | G01C 21/165 701/472 |
| 8,140,223 | B2 * | 3/2012 | Whitehead | G01S 5/0063 701/41 |
| 8,239,162 | B2 * | 8/2012 | Tanenhaus | G01P 15/00 702/145 |
| 8,265,826 | B2 * | 9/2012 | Feller | G05D 1/027 701/472 |
| 8,417,490 | B1 * | 4/2013 | Preston | G06F 30/15 703/2 |
| 8,705,044 | B2 * | 4/2014 | Terrel | G01C 19/721 356/461 |
| 8,717,009 | B2 * | 5/2014 | Tu | G01R 35/00 324/202 |
| 8,823,946 | B1 * | 9/2014 | Logan, Jr. | G01C 19/72 356/462 |
| 8,892,127 | B2 * | 11/2014 | Sridhara | G01S 5/10 455/456.2 |
| 9,212,912 | B1 * | 12/2015 | Salit | G01C 19/727 |
| 9,213,082 | B2 * | 12/2015 | Aggarwal | G01S 13/765 |
| 9,229,084 | B2 * | 1/2016 | Tu | G01R 33/028 |
| 9,291,704 | B2 * | 3/2016 | Sridhara | H04W 4/02 |
| 10,180,325 | B2 * | 1/2019 | Bowers | G01C 19/66 |
| 10,267,924 | B2 * | 4/2019 | Ramanandan | G01S 19/45 |
| 10,288,728 | B2 * | 5/2019 | Lomnitz | G01S 13/0209 |
| 10,366,508 | B1 * | 7/2019 | Liu | G06T 7/74 |
| 10,371,524 | B2 * | 8/2019 | Schwartz | G01C 19/727 |
| 10,371,530 | B2 * | 8/2019 | Ramanandan | G01S 19/49 |
| 10,390,003 | B1 * | 8/2019 | Liu | G06T 7/246 |
| 10,395,117 | B1 * | 8/2019 | Zhang | G06K 9/00805 |
| 10,410,328 | B1 * | 9/2019 | Liu | H04N 5/23229 |
| 10,495,462 | B2 * | 12/2019 | Khial | G01C 19/727 |
| 10,539,676 | B2 * | 1/2020 | Li | G06K 9/00791 |
| 10,562,561 | B2 * | 2/2020 | Wang | B62D 6/001 |
| 10,731,988 | B1 | 8/2020 | Paniccia et al. | |
| 10,769,440 | B1 * | 9/2020 | Zhang | G06T 17/05 |
| 2003/0023355 | A1 * | 1/2003 | Johnson | B64G 1/361 701/4 |
| 2006/0085111 | A1 * | 4/2006 | Kojima | A63H 17/16 701/41 |
| 2008/0269988 | A1 * | 10/2008 | Feller | G01S 19/53 701/41 |
| 2009/0164067 | A1 * | 6/2009 | Whitehead | G01S 19/14 701/41 |
| 2009/0171585 | A1 * | 7/2009 | Hoshizaki | G01C 21/16 701/480 |
| 2009/0244544 | A1 * | 10/2009 | Terrel | G01C 19/727 356/461 |
| 2009/0326851 | A1 * | 12/2009 | Tanenhaus | G01C 21/16 702/96 |
| 2010/0045701 | A1 * | 2/2010 | Scott | H04N 7/183 345/633 |
| 2010/0130229 | A1 * | 5/2010 | Sridhara | H04W 4/027 455/456.1 |
| 2010/0135178 | A1 * | 6/2010 | Aggarwal | G01S 5/14 370/252 |
| 2010/0179758 | A1 * | 7/2010 | Latif | G01S 19/49 701/472 |
| 2010/0207817 | A1 | 8/2010 | Brown | |
| 2010/0301352 | A1 | 12/2010 | Strandjord et al. | |
| 2012/0069346 | A1 * | 3/2012 | Terrel | G01C 19/727 356/471 |
| 2012/0086438 | A1 * | 4/2012 | Tu | G01R 35/00 324/202 |
| 2013/0173207 | A1 * | 7/2013 | Tanenhaus | G01P 15/00 702/145 |
| 2013/0223261 | A1 * | 8/2013 | Aggarwal | H04W 24/00 370/252 |
| 2013/0237246 | A1 * | 9/2013 | Aggarwal | G01S 5/14 455/456.1 |
| 2014/0244200 | A1 * | 8/2014 | Tu | G01R 33/028 702/104 |
| 2014/0267805 | A1 | 9/2014 | Webb | |
| 2015/0025801 | A1 * | 1/2015 | Linton | G01C 19/04 701/530 |
| 2015/0031402 | A1 * | 1/2015 | Sridhara | G01S 19/49 455/456.6 |
| 2015/0362318 | A1 * | 12/2015 | Tai | G01C 19/722 356/461 |
| 2016/0146607 | A1 * | 5/2016 | Celikel | G01C 19/725 356/465 |
| 2016/0223643 | A1 * | 8/2016 | Li | G01S 13/931 |
| 2016/0313125 | A1 * | 10/2016 | Taranta | G01C 19/726 |
| 2017/0287233 | A1 | 10/2017 | Nix | |
| 2017/0299390 | A1 * | 10/2017 | Schwartz | G01C 19/727 |
| 2017/0305458 | A1 * | 10/2017 | Wang | B60W 50/00 |
| 2017/0307375 | A1 * | 10/2017 | Bowers | G01C 19/66 |
| 2017/0356747 | A1 * | 12/2017 | Iagnemma | G01C 21/3461 |
| 2018/0128915 | A1 * | 5/2018 | Lomnitz | G01S 13/9029 |
| 2018/0188032 | A1 * | 7/2018 | Ramanandan | G01C 21/165 |
| 2018/0188384 | A1 * | 7/2018 | Ramanandan | G01S 19/53 |
| 2018/0275277 | A1 * | 9/2018 | Li | G01S 17/86 |
| 2018/0284245 | A1 * | 10/2018 | LaChapelle | G01S 17/42 |
| 2018/0284780 | A1 * | 10/2018 | McWhirter | G05D 1/027 |
| 2018/0356229 | A1 * | 12/2018 | Porsandeh Khial | G01C 19/64 |
| 2019/0033076 | A1 * | 1/2019 | Budin | G01C 25/005 |
| 2019/0227161 | A1 * | 7/2019 | Lomnitz | G01S 13/0209 |
| 2019/0372449 | A1 * | 12/2019 | Mills | G21B 3/00 |
| 2020/0386944 | A1 | 6/2020 | Paniccia et al. | |
| 2021/0010811 | A1 | 1/2021 | Paniccia et al. | |

FOREIGN PATENT DOCUMENTS

| | | | | |
|---|---|---|---|---|
| CN | 101029833 | A * | 9/2007 | |
| CN | 200979501 | Y * | 11/2007 | |
| CN | 101275845 | A * | 10/2008 | |
| CN | 100498228 | C * | 6/2009 | |
| CN | 101493008 | A * | 7/2009 | |
| CN | 101509772 | A * | 8/2009 | |
| CN | 101576383 | A * | 11/2009 | |
| CN | 101839719 | A * | 9/2010 | |
| CN | 102506898 | A * | 6/2012 | G01C 25/005 |
| CN | 103674004 | A * | 3/2014 | G01C 19/721 |
| CN | 103900551 | A * | 7/2014 | G01C 19/72 |
| CN | 104596513 | A * | 5/2015 | G01C 21/16 |
| CN | 104792324 | A * | 7/2015 | G01C 19/72 |
| CN | 105319394 | A * | 2/2016 | |
| CN | 105403212 | A * | 3/2016 | G01C 19/722 |
| CN | 104658012 | B * | 4/2017 | G06T 17/00 |
| CN | 107356241 | A * | 11/2017 | G01C 19/64 |
| CN | 108151725 | A * | 6/2018 | G01C 19/72 |
| CN | 108168537 | A * | 6/2018 | G01C 19/72 |
| CN | 108700420 | A * | 10/2018 | G01C 19/5776 |
| CN | 109086250 | A * | 12/2018 | |
| FR | 3046839 | A1 * | 7/2017 | G01C 19/5776 |

(56) References Cited

FOREIGN PATENT DOCUMENTS

| GB | 2481027 A | * | 12/2011 | | G06T 7/0028 |
| JP | 2009092583 A | * | 4/2009 | | |
| WO | WO-2009077976 A2 | * | 6/2009 | | G01C 17/28 |
| WO | 2012151333 A1 | | 11/2012 | | |

OTHER PUBLICATIONS

Deppe et al., MEMS and FOG Technologies for Tactical and Navigation Grade Inertial Sensors—Recent Improvements and Comparison, Sensors 2017, 17, 567; doi:10.3390/s17030567 (Year: 2017).*

Giner et al., MEMS Gyroscope With Concentrated Springs Suspensions Demonstrating Single Digit Frequency Split and Temperature Robustness, Journal of Microelectromechanical Systems, 2018 (Year: 2018).*

GPS-World, KVH looks to self-driving cars with inertial sensor plans, 2016, available at https://www.gpsworld.com/kvh-looks-to-self-driving-cars-with-inertial-sensor-plans/ (Year: 2016).*

Guang et al., An Autonomous Vehicle Navigation System Based on Inertial and Visual Sensors, Sensors 2018, 18, 2952; doi: 10.3390/s18092952 (Year: 2018).*

Korkishko et al., Strapdown Inertial Navigation Systems Based on Fiber_Optic Gyroscopes, ISSN 2075_1087, Gyroscopy and Navigation, 2014, vol. 5, No. 4, pp. 195-204 (Year: 2014).*

Rasch et al., Fiber-Optic Gyros and MEMS Accelerometers, Microptics, 2004 (Year: 2004).*

George, Jitin, C2000 MCU SafeTI control solutions: An introduction to ASIL decomposition and SIL synthesis, Product Marketing Engineer C2000 Microcontrollers Texas Instruments, Apr. 2019 (Year: 2019).*

Stout, Art, Photonics Applied: Transportation: Datasets accelterate integration of thermal imaging systems into autonomous vehicles, Dec. 1, 2018, available at https://www.laserfocusworld.com (Year: 2018).*

Ward et al., "The uses and abuses of ASIL decompostion in ISO 26262," 7th IET International Confernece on System Safety, incorporation the Cyber Security Conference 2012, 2012, pp. 1-6, doi: 10,1049/cp.2012.1523 (Year: 2012).*

Xie et al., "Heterogeneous silicon photonics sensing for autonomous cars [Invited]," Opt. Express 27, 3642-3663 (2019) (Year: 2019).*

Yi, Emmy, MEMS Sensors—Enabling the Smart Car Revolution, Aug. 27, 2019, available at www.semi.org/en/blogs/technology-trends/mems-sensors-enabling-the-smart-car-revolution (Year: 2019).*

Kafka, Peter, 2012 International Symposium on Safety Science and Technology, The Automotive Standard ISO 26262, the innovative driver for enhanced safety assessment & technology for motor cars, Procedia Engineering 45 (2012) 2-10 (Year: 2012).*

U.S. Department of Transportation, Automated Vehicles 3.0, Preparing for the Future of Transportation, Sep. 28, 2018, available at https://www.transportation.gov/av/3/preparing-future-transportation-automated-vehicles-3 (Year: 2018).*

Xing et al., Performance Enhancement Method for Angular Rate Measurement Based on Redundant MEMS IMUs, Micromachines 2019, 10, 514; doi:10.3390/mi10080514, Aug. 1, 2019 (Year: 2019).*

L. Wang, D. R. Halstead, T. D. Monte, J. A. Khan, J. Brunner and M. A. K. Van Heyningen, "Low-cost, High-end Tactical-grade Fiber Optic Gyroscope Based on Photonic Integrated Circuit," 2019 IEEE International Symposium on Inertial Sensors and Systems (INERTIAL), Naples, FL, USA, 2019, pp. 1-2, doi: 10.1109/ISISS.2019.8739700.

Angela Raucher, "Why You Need ASIL Certified Processor IP For Automotive Safety Applications", https://semiengineering.com/why-you-need-asil-certified-processor-ip-for-automotive-safety-applications/, Semiconductor Engineering, Apr. 13, 2017, 8 pages.

PCT International Search Report and Written Opinion for International Application No. PCT/US2020/056176 dated Jan. 6, 2021, 13 pages.

* cited by examiner

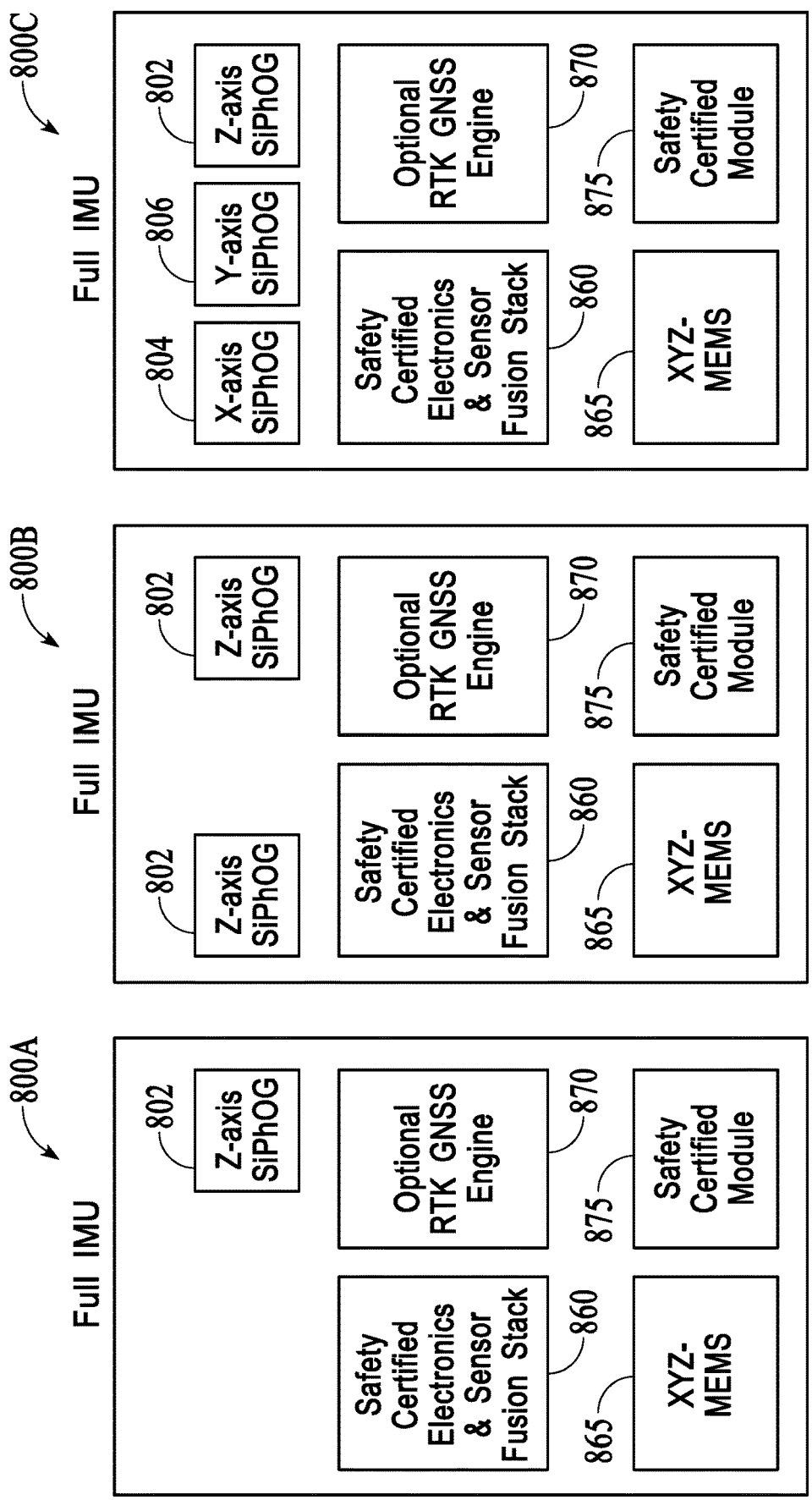

INTEGRATED PHOTONICS OPTICAL GYROSCOPES OPTIMIZED FOR AUTONOMOUS TERRESTRIAL AND AERIAL VEHICLES

RELATED APPLICATION

This application claims the benefit of U.S. Provisional Patent Application No. 62/923,234, filed Oct. 18, 2019, entitled, "Integrated Photonics Optical Gyroscopes Optimized for Autonomous Terrestrial and Aerial Vehicles," the entirety of which is incorporated by reference herein.

TECHNICAL FIELD

The present disclosure relates to integration of integrated photonics-based optical gyroscopes into autonomous vehicles.

BACKGROUND

Gyroscopes (sometimes also referred to as "gyros") are sensors that can measure angular velocity. Gyroscopes can be mechanical or optical, and can vary in precision, performance cost and size. Mechanical gyroscopes based on Coriolis effect typically have lower cost, but cannot deliver a very high performance, and are susceptible to measurement errors induced by temperature, vibration and electromagnetic interference (EMI). Optical gyroscopes typically have the highest performance and rely on interferometric measurements based on the Sagnac effect (a phenomenon encountered in interferometry that is elicited by rotation). Since optical gyroscopes do not have any moving parts, they have advantages over mechanical gyroscopes as they can withstand effects of shock, vibration and temperature variation much better than the mechanical gyroscopes with moving parts.

The most common optical gyroscope is the fiber optical gyroscope (FOG). Construction of a FOG typically involves a long loop (the loop may constitute a coil comprising several turns) of polarization-maintaining (PM) fiber. Laser light is launched into both ends of the PM fiber traveling in different directions. If the fiber loop/coil is moving, the optical beams experience different optical path lengths with respect to each other. By setting up an interferometric system, one can measure the small path length difference that is proportional to the area of the enclosed loop and the angular velocity of the rotating coil.

FOGs can have very high precision, but at the same time, they are of large dimension, are very expensive, and are hard to assemble due to the devices being built based on discrete optical components that need to be aligned precisely. Often, manual alignment is involved, which is hard to scale up for volume production. The present disclosure provides a solution to this problem, as described further below.

A plurality of gyroscopes and other sensors (such as accelerometers, and in some cases magnetometers) may be packaged together as an Inertial Measurement Unit (IMU) in a moving object to sense various motion parameters along the X, Y, and Z axes. For example, a 6-axis IMU may have 3-axis accelerometers and 3-axis gyroscopes packaged together to measure an absolute spatial displacement of the moving object. Applications of IMUs include, but are not limited to, military maneuvers (e.g., by fighter jets, submarines), commercial aircraft/drone navigation, robotics, autonomous vehicle navigation, virtual reality, augmented reality, gaming etc.

For navigation applications, an IMU may be a part of an Inertial Navigation System (INS) that may be aided by navigation data provided by a Global Navigation Satellite System (GNSS), such as Global Positioning System (GPS), GLONASS, Galileo, Beidou etc. GNSS-aided INS receivers use sophisticated fusion algorithms to deliver accurate position, velocity and orientation for a moving object by combining data from various local physical sensors and data obtained from GNSS. However, when GNSS signal is absent or degraded, for example, when a car is in a tunnel or in an urban canyon, data from local physical sensors become the only source of accurate position prediction using alternative algorithms, such as dead reckoning (DR). Receivers with DR capability use data from gyroscopes, accelerometers, odometer, wheel speed sensor etc. to predict upcoming position and direction of movement (heading) of a moving object based on last known position.

One parameter-of-interest in IMU is Angle Random Walk (ARW), which is a noise parameter that describes average deviation or error that occurs when gyroscope signal is integrated over a finite amount of time to calculate angular movement of the moving object. This error is a critical component of DR algorithm. In general, a low bias stability value corresponds to a low ARW, and a low bias estimation error. For example, a gyro with a bias instability of 0.5°/Hr typically has an ARW of 0.02-0.05°/√Hr, which characterizes a high-performance gyroscope, such as a FOG. On the other hand, low-performance mechanical gyroscopes (such as a micro-electro-mechanical systems (MEMS)-based gyroscope) may have much higher ARW and bias stability values (e.g., ARW of 0.3°/√Hr and a larger bias instability value of 3.5°/Hr or higher). High bias estimation error in the gyroscope measurement may render the data meaningless especially when the sensor also experiences thermal changes. For example, MEMS gyroscopes may have a bias estimation error in the range of 100°/Hr or even as high as 1000°/Hr. A large thermal error in the range of 1000°/Hr makes a gyroscope-based bias estimation with accuracy less than 100°/Hr impractical.

SUMMARY

Novel small-footprint integrated optical gyroscopes disclosed herein can provide bias stability below 0.5°/Hr and ARW in the range of 0.05°/√Hr or below (e.g. as low as 0.01°/√Hr), which makes them comparable to FOGs in terms of performance, at a much lower cost. Integrated optical gyroscopes may be based on silicon photonics, which are abbreviated as SiPhOG™ (Silicon Photonics Optical Gyroscope), though compound semiconductor (III-V semiconductor) based integrated optical gyroscopes are also within the scope of this disclosure. Moreover, as described below, integrated optical gyroscopes may have a front-end chip made of integrated photonics that can launch and receive light from a rotation sensing element. The rotation sensing element of the optical gyroscope can comprise a fiber loop or another integrated photonics waveguide chip (e.g, a silicon nitride waveguide-based coil or microresonator ring). The low-bias estimation error available when using an integrated optical gyroscope (in the range of 1.5°/Hr or even lower) is crucial for safety-critical applications, such as calculating heading for autonomous vehicles, drones etc. Note that the word "autonomous vehicle" encompasses terrestrial, aerial or marine vehicles with the capability to be driven in a semi-autonomous or fully autonomous mode, even though some of the specific illustrative examples are described with respect to autonomous terrestrial vehicles.

Integrated photonics optical gyroscopes have two main components. The first component is an integrated photonics chip (e. g., "SiPh chip" or "integrated SiPh chip" in case of a silicon photonics optical gyroscope) designed with higher-level system architecture and key performance parameters in mind, including, but not limited to laser performance, tuning parameters, detector parameters, as well as packaging considerations. This chip houses lasers, phase shifters, detectors, optical splitters etc. The second component is a waveguide-based optical gyroscope chip ("OG chip" or "gyro chip" or "sensing chip") that has a waveguide coil or a ring resonator. The waveguide may be made of silicon nitride (SiN). Therefore the SiN waveguide-based OG chip is also referred to as "SiN waveguide chip" or simply "SiN chip". In one embodiment, the OG chip is hybridly integrated with the integrated photonics chip. In some advanced embodiments, the integrated photonics chip and the OG chip may be monolithically fabricated on the same chip or stacked via wafer bonding. Low waveguide loss in the gyro chip is the key to a desired gyroscope sensitivity value that is associated with lower bias estimation error.

The integrated photonics optical gyroscope may be modularized (e.g., a SiPh chip and OG chip may be packaged together) on a Printed Circuit Board (PCB) using standard pick and place techniques. The PCB may also have control electronics for the integrated photonics chip, and can be integrated with the motherboard that supports the main architecture of the IMU. The modular design allows introduction of the same optical gyroscope product to different IMU PCBs customized for different markets, as the form factor of the optical gyroscope module remains the same. One such market is Automated Driver Assistance System (ADAS) for autonomous vehicles, but persons skilled in the art would appreciate that the scope of the disclosure is not limited to ADAS only. The wafer level processing and standard IC packaging and assembly techniques enable large scale volume manufacturing of optical gyroscope modules for various system architectures for various markets, including both commercial and military applications.

BRIEF DESCRIPTION OF THE DRAWINGS

The present disclosure will be understood more fully from the detailed description given below and from the accompanying drawings of various implementations of the disclosure. Please note that the dimensions shown in the figures are for illustrative purposes only and not drawn to scale.

FIG. 8A illustrates a block diagram showing components of a 6-axis hybrid inertial measurement unit (IMU) having a 6-axis MEMS module and a single-axis SiPhOG module, according to an embodiment of the present disclosure.

FIG. 8B illustrates a block diagram showing components of a 6-axis hybrid inertial measurement unit (IMU) having a 6-axis MEMS module and two single-axis SiPhOG modules for the same axis for achieving redundancy, according to an embodiment of the present disclosure.

FIG. 8C illustrates a block diagram showing components of a 6-axis hybrid IMU having a 6-axis MEMS module and three single-axis SiPhOG modules for three different axes, according to an embodiment of the present disclosure.

DETAILED DESCRIPTION

Figure 1:
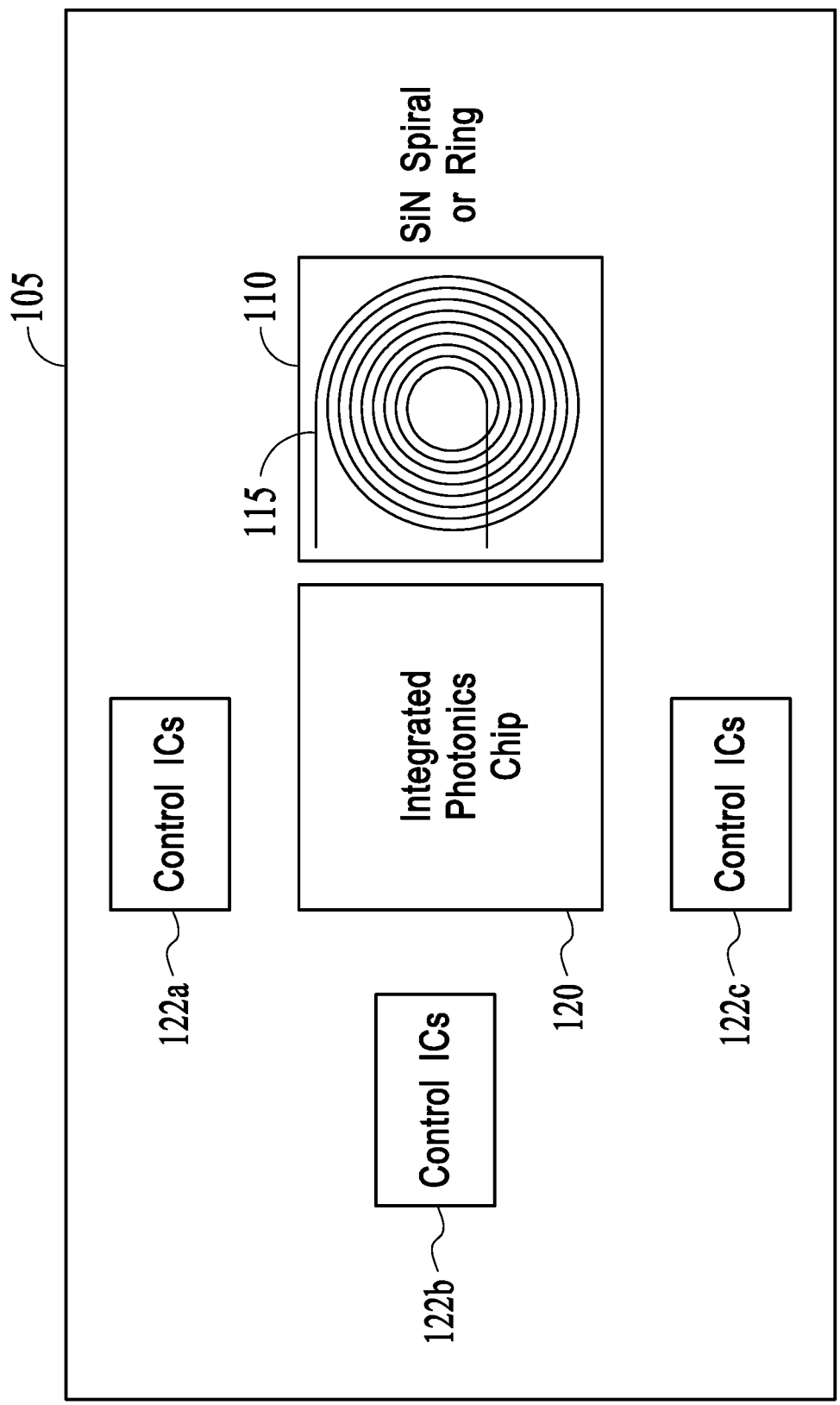
FIG. 1 illustrates the main components of a single axis SiPhOG module, according to an embodiment of the present disclosure.

Aspects of the present disclosure are directed to integration of compact ultra-low loss waveguide-based optical gyroscope modules with other system-level electronic components to produce a high-performance inertial measurement unit (IMU). The system integration is done with large scale manufacturing in mind to facilitate mass production of integrated photonics optical gyroscopes, for example, SiPhOGs. Note that thought the term "SiPhOG" has been used generically throughout the specification, it is a registered trademark of Anello Photonics, Santa Clara, Calif.

Some sensing applications may need high-precision optical gyroscope for just one axis to supplement or replace low-precision measurement by a low-cost mechanical gyroscope (such as a micro-electro-mechanical systems (MEMS)-based gyroscope), while the other two axes may continue to use low-precision measurement from low-cost mechanical gyroscopes. One such example is gyroscopes in safety sensors relied upon by automatic driver assistance systems (ADAS) for current and future generations of autonomous vehicles, especially for Level 2.5/Level 3 (L2.5/L3) markets. In ADAS, high-precision angular measurement may be desired only for Z-axis (the yaw axis) for determining heading, because the vehicle stays on the X-Y plane of a rigid road. The angular measurement for the X and Y axis (pitch and roll axes) may not be safety-critical in this scenario. The present inventors recognize that by bringing down the cost of high precision optical gyroscopes at least for one axis translates to overall cost of reduction of the IMU that would facilitate mass market penetration. Additionally, as needed, the mechanical gyroscopes in the other two axes may also be replaced or supplemented by optical gyroscopes with proper design of system level integration in all 3 axes (pitch, roll and yaw axes), for example in unmanned aerial vehicles (e.g., drones), construction, farming, industrial, marine vehicles, L4/L5 markets and certain military applications.

The key to FOG's high performance is the long length of high quality, low loss, polarizing maintaining optical fiber that is used to measure the Sagnac effect. The present inventors leverage wafer scale processing of silicon photonics components as means to replace FOGs with smaller and cheaper integrated photonic chip solutions without sacrificing performance. Photonics-based optical gyros have reduced size, weight, power and cost, but at the same time they can be mass produced in high volume, are immune to vibration and have the potential to offer performances equivalent to FOGs.

The integrated photonics optical gyroscope module may be part of a novel hybrid 6-axis IMU configuration where high-accuracy angular measurement for a crucial axis (e.g., yaw axis in a vehicle) is combined with medium accuracy angular measurements for the other non-crucial axes (e.g. the pitch and roll axes) in a single chip. The single chip may already have the architecture to support the operation of a 6-axis MEMS IMU (3-axis gyroscopes and 3-axis accelerometer). This allows the system to access readings from 6 axes for sensor fusion algorithms, which may be required if the IMU is to be used in conjunction with alternative sensing technologies, such as Light Detection and Ranging (LIDAR), and camera-based systems. Additionally, the SiPhOG provides redundancy, as the IMU can rely on pure dead reckoning algorithm for a longer period of time, when the alternative sensing technologies are malfunctioning. This redundancy may be invaluable for safety-critical applications, such as bringing an autonomous vehicle to a safe stop 'blindly', i.e. without the assistance of the camera/LIDAR, and/or when satellite signal for navigation is lost.

Single-axis integrated photonics optical gyroscope module may be introduced for ADAS for Level 2.5/3 autonomous vehicles in near term, and eventually transition to Level 4 autonomous vehicles. In addition, 3-axis integrated photonics optical gyroscopes may be introduced to other higher-end IMU markets, such as commercial drones, airplanes, trucking, construction, farming etc. The ultimate goal is to bring the performance of aircraft grade inertial navigation system to mass market autonomous vehicles (terrestrial as well as aerial) and consumer electronics and media components.

In the following figures, SiPhOGs are described as an illustrative representation of an integrated photonics optical gyroscope, though the scope of the disclosure also encompasses III-V photonics based optical gyroscopes or a combination of silicon photonics and III-V photonics based optical gyroscopes.

FIG. 1 illustrates the main components of a single axis SiPhOG module 100, according to an embodiment of the present disclosure. SiPhOG module 100 comprises an integrated SiPh chip 120 and a waveguide chip 110. The waveguide chip 110 may have SiN waveguides, and hence called SiN chip. Waveguide chip 110 has a waveguide gyro coil 115 which receives optical signal from a laser which may be on SiPh chip 120 or elsewhere on a packaging substrate 105. The integrated SiPh chip 120 and waveguide chip 110 may be assembled together on the packaging substrate 105, which may be a printed circuit board (PCB). There may be other control electronics in the form of one or more individual ICs 122, e.g. 122a-c.

Optical signal from the SiPh chip 120 may be coupled to the SiN chip 110 and after going through the waveguide coil 115, the optical signal eventually couples back to the SiPh chip 120 to be detected by a photodetector that measures the optical phase change due to Sagnac effect. This detector is sometimes referred to as a Sagnac detector. System-level integration of SiPh chip and SiN chip have been covered in provisional applications 62/872,640 filed Jul. 10, 2019, titled "System Architecture for Silicon Photonics Optical Gyroscopes", and 62/904,443 filed Sep. 23, 2019, titled, "System Architecture for Silicon Photonics Optical Gyroscopes with Mode-Selective Waveguides." The applications are incorporated herein by reference. Note that in addition to what is described in those applications, for built-in redundancy, two separate SiN chips may be coupled to a single SiPh chip that has two sets of integrated photonics components. Alternatively, a second layer in a single SiN chip may be used for built-in redundancy, i.e. two complete waveguide coils will be available to couple to the SiPh chip. These redundancy concepts are illustrated with respect to FIGS. 7A and 7B.

Figure 2:
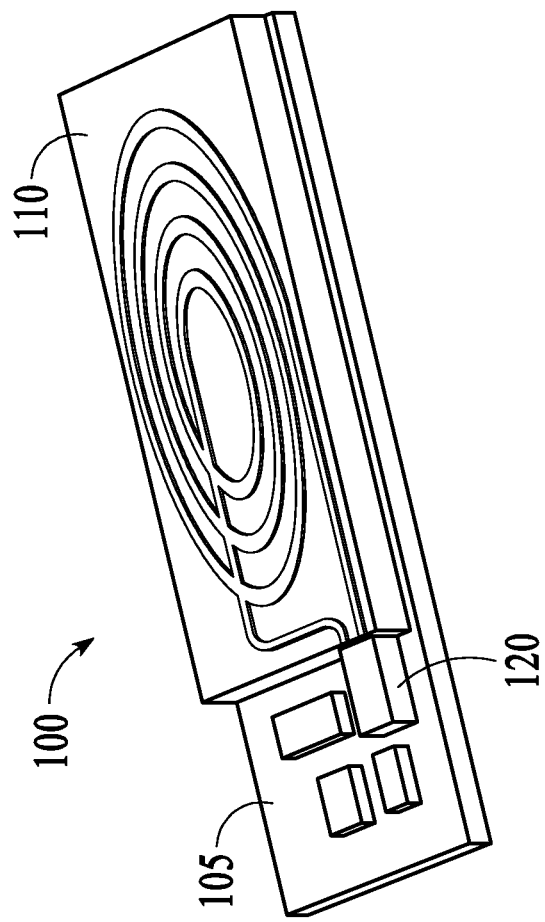
FIG. 2 illustrates a perspective schematic view of the single-axis SiPhOG shown in FIG. 1.

FIG. 2 illustrates a perspective schematic view of the single-axis SiPhOG module 100. Note that though not drawn to scale, the SiN chip 110 may be substantially larger than the SiPh chip, and may decide the total form factor of the SiPhOG module 100. Note that packaging substrate 105 may have additional circuits in the back surface, and may have designated bonding pads to be attached to another packaging substrate of a bigger module (such as an IMU).

Figure 3:
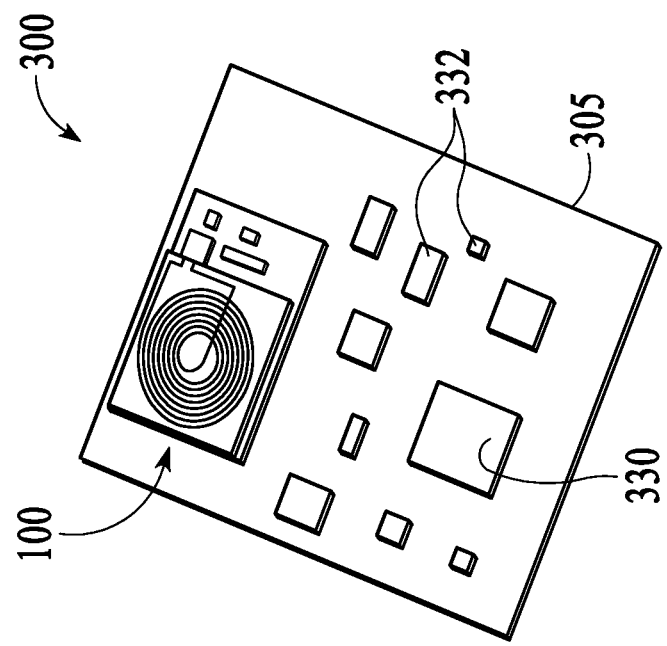
FIG. 3 illustrates a schematic view of a printed circuit board (PCB) of an IMU with a single-axis SiPhOG, according to an embodiment of the present disclosure.

FIG. 3 illustrates a schematic view of a printed circuit board (PCB) 305 of an IMU with a single-axis SiPhOG module 100, according to an embodiment 300 of the present disclosure. PCB 305 may have a processor 330 to process data from the SiPhOG 100 as well as other signal/data received by the IMU (e.g., accelerometer data, GNSS data, mechanical gyroscope data). Processor 330 may have a central processing unit (CPU), which may be combined with a digital signal processor (DSP). Additionally, other ICs 332 may be on the same PCB. SiPhOG module 100 may be assembled on the PCB 305 by flip-chip bonding or other standard packaging techniques. When a SiPhOG module is used only for one axis, some of the ICs 332 on the PCB 305 may be MEMS gyroscopes for the other axes. Also, a 6-axis MEMS device may be packaged on the PCB along with the SiPhOG module 100 augmenting the precision of angular measurement for just one axis (e.g. the yaw axis).

Figure 4:
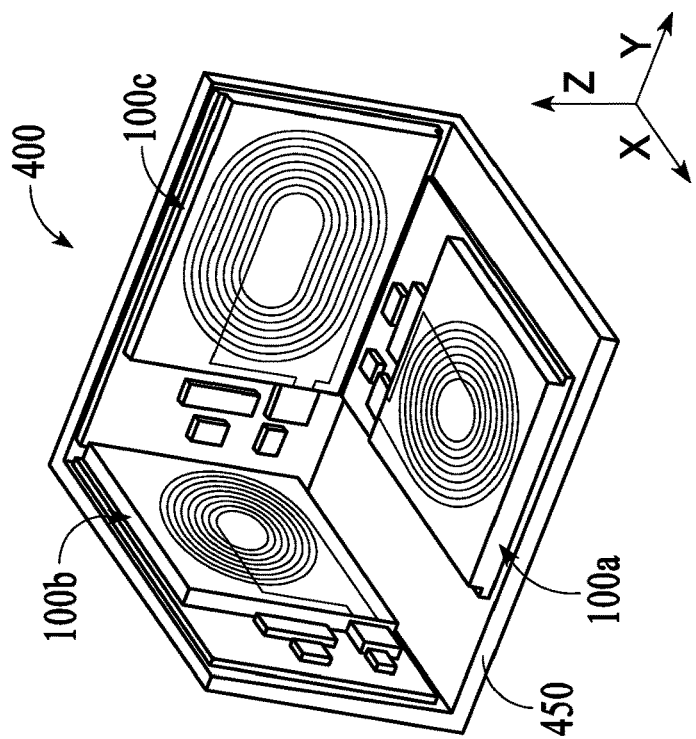
FIG. 4 illustrates a schematic view of three single-axis SiPhOGs packaged together to implement a 3-axis gyroscope, according to an embodiment of the present disclosure.

FIG. 4 illustrates a schematic view of three single-axis SiPhOG modules packaged together, according to an embodiment 400 of the present disclosure. Embodiment 400 may have a three-dimensional housing 450 to attach the three SiPhOG modules 100a, 100b and 100c for Z, X and Y axes respectively.

Figure 5:
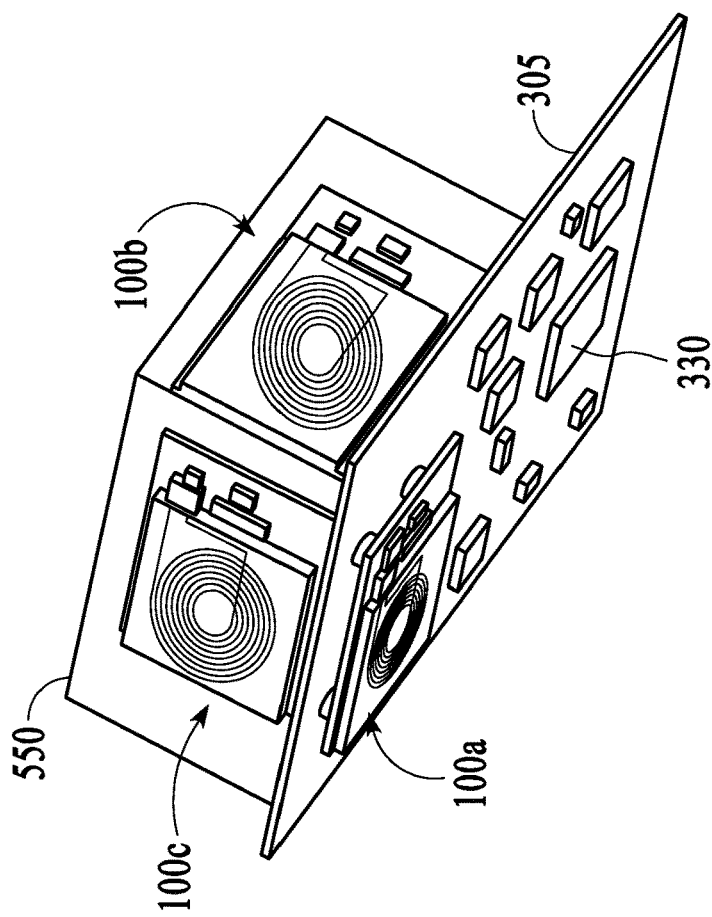
FIG. 5 illustrates the schematic view of an embodiment of a 3-axis optical gyroscope comprising two additional single-axis SiPhOGs for two additional axes packaged together on a PCB that already has a single-axis SiPhOG attached to it, according to an embodiment of the present disclosure.

FIG. 5 illustrates the schematic view of another embodiment 500 of a 3-axis optical gyroscope comprising two additional single-axis SiPhOGs packaged together on a PCB that already has a single-axis SiPhOG attached to it (e.g., as shown in embodiment 300). Embodiment 500 may be part of a hybrid IMU where the PCB 305 has a processor 330 and optionally a 6-axis MEMS device (not shown). The SiPhOG 100a for the Z axis may be assembled on the PCB 305 while two more vertical panels 550 may be attached with the PCB 305 in such a way that data from the SiPhOGs 100b and 100c are routed to the processor 330 through the PCB 305.

In general, the lower the gyroscope sensitivity value, the lower the angular drift of an object for a known speed.

Gyroscope sensitivity varies depending on the physical dimensions associated with the gyroscope. Phase signal of an optical gyro is proportional to the Sagnac effect times the angular rotation velocity, as shown in the following equation:

$$\Delta\phi = (8\pi NA/\lambda c)\Omega$$

where, N=number of turns in the gyro,
A=area enclosed,
Ω=angular rotation velocity,
Δϕ=optical phase difference signal,
λ=wavelength of light,
c=speed of light.

Figure 6C:
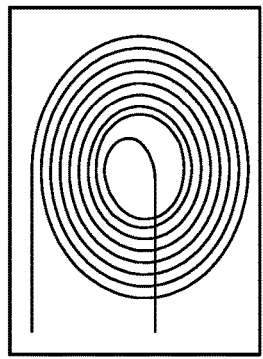
FIG. 6C illustrates a die layout of a third SiPhOG configuration, according to embodiments of the present disclosure.
Figure 6B:
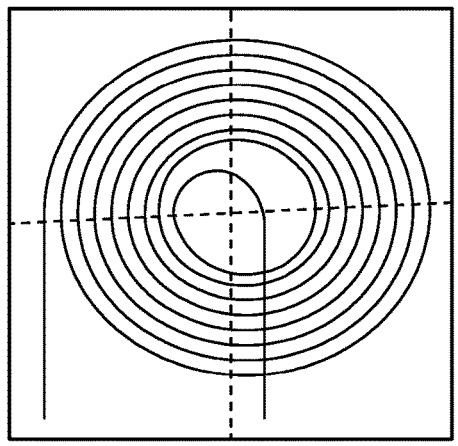
FIG. 6B illustrates a die layout of a second SiPhOG configuration, according to embodiments of the present disclosure.
Figure 6A:
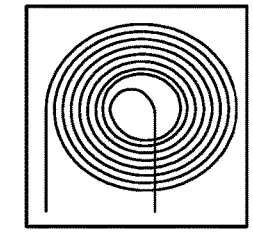
FIG. 6A illustrates a die layout of a first SiPhOG configuration, according to embodiments of the present disclosure.

For example, a smaller waveguide coil (with a smaller enclosed area 'A') that can be accommodated within a single die (as shown in FIG. 6A) may have a higher gyro sensitivity value. But with a larger die (e.g., a quad die shown in FIG. 6B), a much lower gyro sensitivity value can be achieved, which indicates better gyro performance. A dimension of a single die may be 22.5 mm×22.5 mm, while the dimension of a quad die may be 45 mm×45 mm, and therefore the waveguide coil in a quad die encloses more area, and the Sagnac effect is more prominent. A larger reticle (as shown in FIG. 6C) for a single die may have an intermediate dimension of 26 mm×33 mm and may produce an intermediate gyro sensitivity value. The present inventors have come up with SiN waveguide design that reduced the gyro sensitivity value to much below 1°/Hr. The die size determines the size of the SiN chip, which in turn determines the form factor of the SiPhOG module. Size of SiN chip depends on waveguide width and how closely adjacent waveguides in a waveguide coil can be laid out to avoid crosstalk. Different size SiN chips would allow entry into different markets. For example, size and weight reduction of the IMU may be a bigger factors for commercial drones than they are in ADAS of terrestrial autonomous vehicles.

Figure 6D:
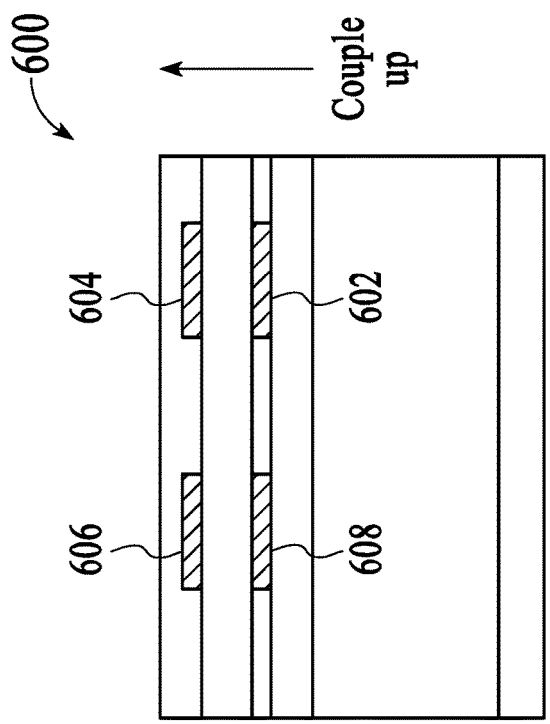
FIG. 6D schematically illustrates the die stacking concept, according to an embodiment of the present disclosure.

The present inventors recognize that distributing the SiN waveguide coil into different layers (e.g., two or more layers) leads to lower values of gyro sensitivity without increasing the form factor. For example, a gyro sensitivity value can be approximately reduced to half for the same form factor if two layers are stacked. As shown in the cross section of the SiN chip in FIG. 6D, stacking requires the light coupled at the input waveguide 602 in the bottom layer to couple up from the bottom layer to the top layer (where parts 604 and 608 of the waveguide coil reside) and then again couple down from the top layer to the bottom layer to be coupled out at the output waveguide 608.

Details of a stacked multi-layer gyro configuration are covered in provisional application 62/858,588 filed on Jun. 7, 2019, titled, "Integrated Silicon Photonics Optical Gyroscope on Fused Silica Platform." A follow-up provisional application 62/896,365 filed on Sep. 5, 2019, titled "Single-layer and Multi-layer Structures for Integrated Silicon Photonics Optical Gyroscopes" describes additional embodiments. The applications are incorporated herein by reference.

Figure 6E:
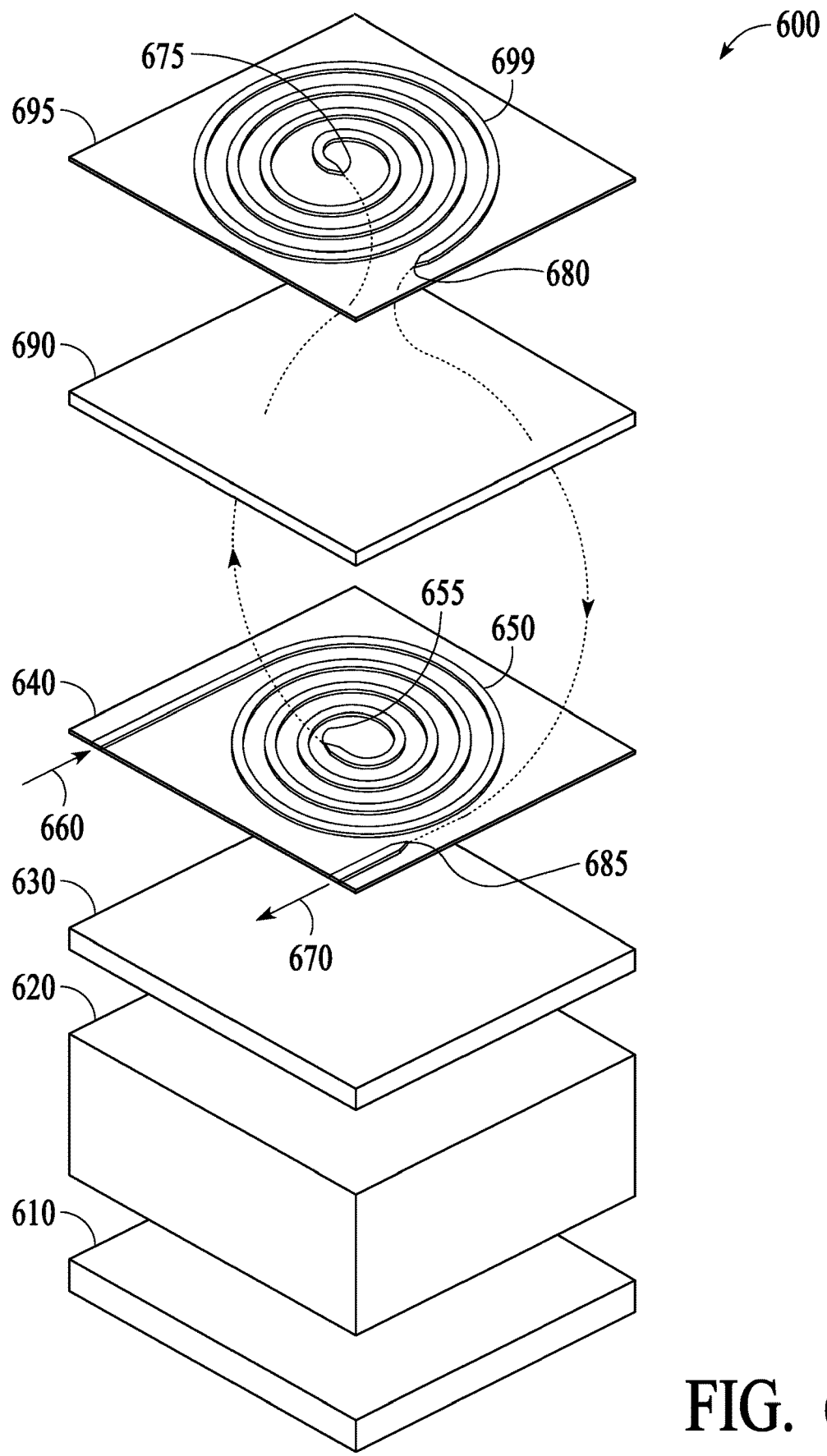
FIG. 6E schematically further illustrates the die stacking concept, according to an embodiment of the present disclosure.

FIG. 6E is an exploded perspective view of a spiral waveguide based SiN chip 600 where the output SiN waveguide does not intersect with the SiN waveguide coils. There are coils both on the top plane and the bottom plane, and the output SiN waveguide comes out from the same plane as the input SiN waveguide. This is an important aspect of the design, because efficient coupling with external components (e.g., lasers, detectors etc.) depends on the output SiN waveguide and the input SiN waveguide to be on the same plane. Also, by distributing the total length of the coil between two layers (top and bottom), intersection of SiN waveguides can be avoided, which is a problem the conventional photonic gyros encounter, as the direction of propagation of light has to remain the same within the coil. In addition intersecting waveguides increases the scattering loss which the design in FIG. 6E can avoid. Note that the length of the coil can be distributed in two, three or even large number of layers by proper design.

In FIG. 6E, the substrate 620 is preferably fused silica, though other materials (e.g., Si and oxide) can be used. Layers 610 and 630 and 690 may be oxide or fused silica layers. The layer 640 with the spiral waveguide 650 is preferably fused silica but may be oxide ($SiO_2$) also. The input end that receives an optical signal is denoted as 660, wherein the output end is denoted as 670. The waveguide coil has a bottom portion 650 that spirals inwards to the tapered tip 655, where it couples up to the top layer 695 that has the rest of the waveguide coil (top portion 699). Thickness of a layer 690 (typically an oxide layer in between the layers 640 and 695) sets the coupling gap. The top portion 699 of waveguide coil starts from the tapered tip 675, and spirals outwards to the other tapered tip 680, from where light couples down to the tapered tip 685 of the waveguide on the bottom plane to go out via output port 670 (to a detector or other optical system components). The arrowed dashed lines show the coupling up and coupling down between the tapered tips in the two planes. The taper design and the vertical separation between the two layers with waveguides dictate coupling efficiency between the two planes. In order for light to couple between the two vertical planes, the tapered tips 655 and 675 must have some overlap, and the tapered tips 680 and 685 must have some overlap.

Note that for built-in redundancy, two separate SiN chips may be coupled to a single SiPh chip that has two sets of integrated photonics components. Alternatively, a second layer in a single SiN chip may be used for built-in redundancy, i.e. two complete waveguide coils can be stacked vertically by wafer fusion. Note that the platform for the gyroscope coil can be SiN waveguide core in fused silica, or SiN waveguide core in oxide cladding. Fabrication process for both configurations are described in the U.S. patent application Ser. No. 16/894,120, titled "Single-layer and multi-layer structures for integrated silicon photonics optical gyroscopes," filed Jun. 5, 2020, and provisional U.S. patent application No. 63/079,928, titled, "Chemical-mechanical polishing for fabricating integrated photonics optical gyroscopes," filed Sep. 17, 2020, both of which are incorporated herein by reference.

Figure 7A:
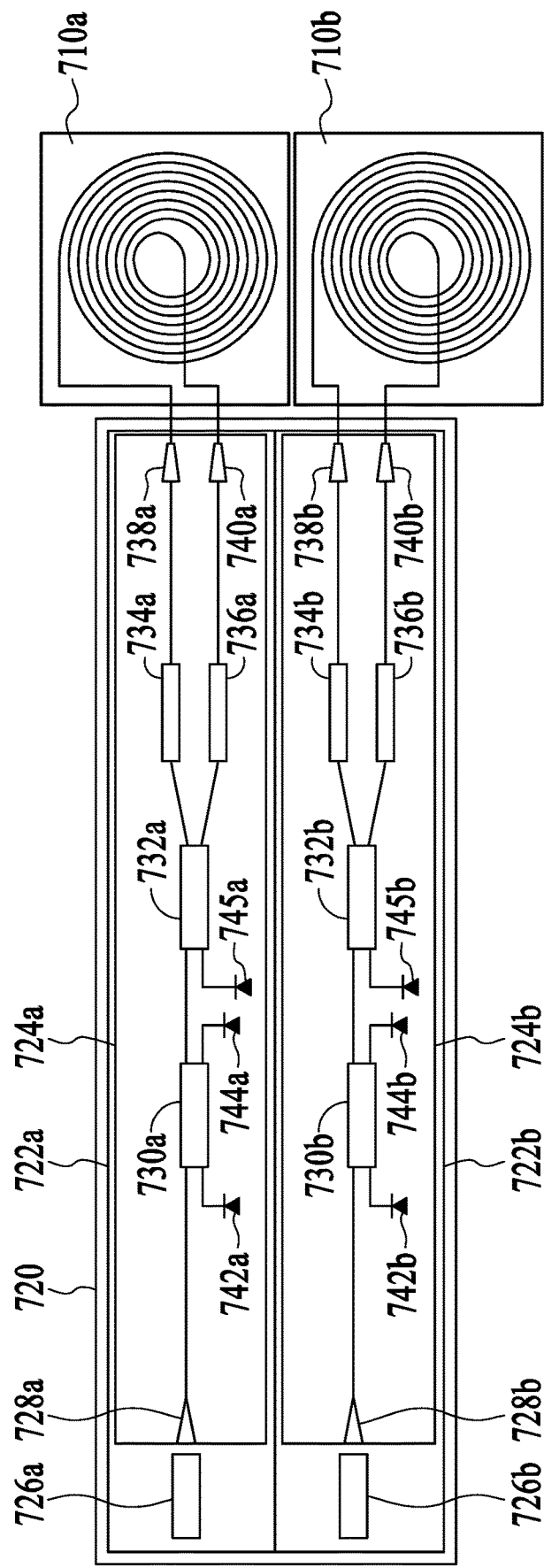
FIG. 7A illustrates a first way to build redundancy in a SiPhOG module for single-axis angular measurement, according to an embodiment of the present disclosure.

FIG. 7A illustrates one way of incorporating redundancy into a SiPhOG module. A SiPh chip 720 may have two identical integrated photonics components 724a and 724b, coupled to SiN waveguide chips 710a and 710b respectively. Each integrated photonics component comprises a laser coupled to the integrated photonics components. For example, laser 726a is coupled to the integrated photonics component 724a, and laser 726b is coupled to the integrated photonics component 724b. Lasers and the integrated photonics components may be packaged together on a common substrate (e.g., 722a and 722b). In some embodiments, lasers are monolithically integrated on the integrated photonics component. Integrated photonics component 724a has an input waveguide end 728a, which may be flared (or tapered) for better mode match with the laser 726a. Additional optical components may include 2×2 splitters 730a and 732a, phase modulators 734a and 736a, and detectors 742a, 744a and 745a. The two output waveguide ends 738a and 740*a* may be tapered for better coupling into the SiN waveguide chip 710*a*. Detector 742*a* may act as the Sagnac detector that receives the optical phase difference signal from the SiN chip 710*a*, from which angular rotational velocity is derived. The detectors may be PIN diodes, a waveguide-based detector or an avalanche photodiode (APD). Design of the waveguides in the integrated photonics component 724*a* and 724*b* are described in detail in applications 62/872,640 filed Jul. 10, 2019, titled "System Architecture for Silicon Photonics Optical Gyroscopes", and 62/904,443 filed Sep. 23, 2019, titled, "System Architecture for Silicon Photonics Optical Gyroscopes with Mode-Selective Waveguides." Individual elements of integrated photonics component 724*b* are functionally identical to correspondingly labeled elements of integrated photonics component 724*a*.

Figure 7B:
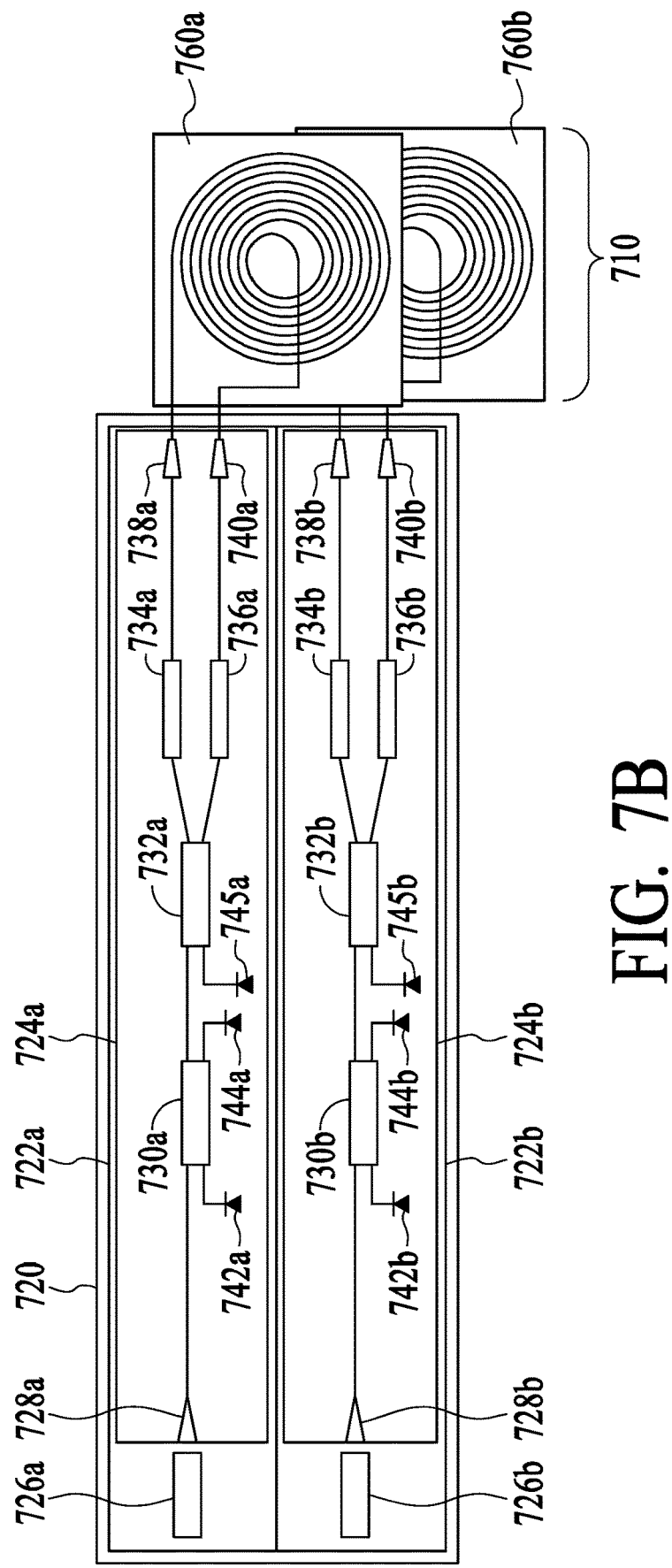
FIG. 7B illustrates a second way to build redundancy in a SiPhOG module for single-axis angular measurement, according to an embodiment of the present disclosure.

FIG. 7B illustrates another way of incorporating redundancy into a SiPhOG module, where two layers 760*a* and 760*b* are stacked via wafer bonding in the same SiN chip 710 to accommodate two waveguide coils or could be grown via standard wafer processing. Each of the two waveguide coils may be distributed among the two layers 760*a* and 760*b* (i.e. instead of one waveguide coil shown in FIG. 6E, there will be two waveguide coils), or, each waveguide coil may have accommodated in its own respective layer. Please refer to U.S. patent application Ser. No. 16/894,120, titled "Single-layer and multi-layer structures for integrated silicon photonics optical gyroscopes," filed Jun. 5, 2020, for detailed description.

FIG. 8A illustrates a block diagram showing components of a 6-axis hybrid inertial measurement unit (IMU) having a 6-axis MEMS module and a single-axis SiPhOG module, according to an embodiment of the present disclosure. FIG. 8B illustrates an additional single-axis SiPhOG module for redundancy in single-axis measurement (everything else being identical to FIG. 8A). FIG. 8C illustrates a block diagram showing components of a 6-axis hybrid IMU having a 6-axis MEMS module and three single-axis SiPhOG modules, according to an embodiment of the present disclosure. The single-axis SiPhOG embodiments 800A or 800B may be enough for applications where precision angular measurement is required only for one axis, as described before, e.g., yaw axis of terrestrial autonomous vehicles, especially L2.5/3 autonomous vehicles. The three-axis SiPhOG embodiment 800C may be required where precision angular measurement is required for all three of the pitch, roll and yaw axes, for example aeronautics, commercial drones, robotics, construction, farming or L4/L5 autonomous vehicles. This may also include bringing in data from cameras, radar and other sensors that get "fused" together to help with navigation.

Embodiments 800A, 800B and 800C rely on digital signal processing with sufficient internal integrity monitoring to achieve Automotive Safety Integrity Level (ASIL) certification. There are currently four levels of ASIL identified by International Standards Organization (ISO): A, B, C and D. ASIL-D refers to the highest integrity requirement on the product design and requires the most high-performance gyroscopes to lower the injury risk in an autonomous vehicle. An IMU may have a safety certification module 875 for integrity monitoring of internal electronic and optical sensors, as well as the integrity of the algorithms. Module 860 represents safety-certified electronics and sensor fusion stack. Sensor fusion stack refers to a collection of software modules that collectively process raw sensor data (e.g., accelerometer, SiPhOG gyro, MEMS gyro, wheel odometer, and GNSS raw measurements) into a best estimate of attitude, heading, velocity and position, as well as internal estimates of sensor errors such as the gyro bias estimate. These internal estimates are typically referred to as the "state" of the system. System state is estimated and updated by means of a sensor fusion technique, such as the Extended Kalman Filter. In order to implement sensor fusion, several layers of processing are required. First, data is acquired via specialized driver software which may include code to access digital circuits inside the IMU as well as read external sensors via a vehicle bus, such as using the vehicle Control Area Network (CAN) bus to retrieve wheel speed data. The next operation comprises calibration and integrity checks of the acquired raw sensor data. This is followed by high-rate navigation prediction. This prediction may occur at a rate of 100-200 Hz, and in the prediction all the available information is processed to estimate vehicle attitude, heading, velocity, and position. Additional sensor processing tasks may occur asynchronously to the main navigation update. These tasks include GNSS processing of GNSS raw measurements to a GNSS-based position estimate. This step may optionally include GNSS correction techniques using external corrections of satellite orbit and satellite-to-receiver clock errors, as well as localized corrections for ionosphere and troposphere related distortion of GNSS measurement. Such techniques are referred to as Real-Time Kinematic (RTK) or Precise Point Positioning (PPP) processing and reduce GNSS position error from meter level to centimeter level in clear sky conditions. GNSS processing typically occurs at rates of 1-20 Hz, slower than the high-rate real-time navigation prediction. Lastly, the Kalman Filter itself does a periodic measurement update step that involves significantly more computation and can be computed as slower rate because the outputs of the measurement update such as the gyro bias estimate change more slowly. Typical measurement update occurs at 1 Hz. Data from the sensor fusion software is output on standardized interfaces which include asynchronous serial, synchronous serial, CAN bus, as well as Ethernet. Finally, when the GNSS receiver is included in the IMU, the IMU will also typically provide a hardware time pulse output used to synchronize the time of other vehicle subsystems using the internal GNSS as the time master. In cases where the IMU fuses external GNSS data, the IMU may make a provision to receive a hardware time pulse input and synchronizes its sampling and processing to this external time reference. This collective set of processing steps is referred to as the sensor fusion stack. Sensor fusion algorithms predict position and trajectory of a moving object by combining data from all the available physical sensors. For example, the sensor fusion stack in module 860 in a hybrid IMU receives as input data from the Z-axis SiPhOG(s) 802 (or from all three SiPhOGs 802, 804 and 806, as shown in FIG. 8C), as well as from the on-board XYZ MEMS 865 providing 3-axis gyro and 3-axis accelerometer data. Additional sensor data (e.g., odometer, magnetometer, cameras, radar etc.) may also be used in the sensor fusion algorithm. The GNSS engine 870 may receive satellite data (when satellite signal is available) to augment the accuracy of prediction. GNSS-based prediction can be further assisted by data received from Real-Time Kinematic (RTK) network.

Figure 9:
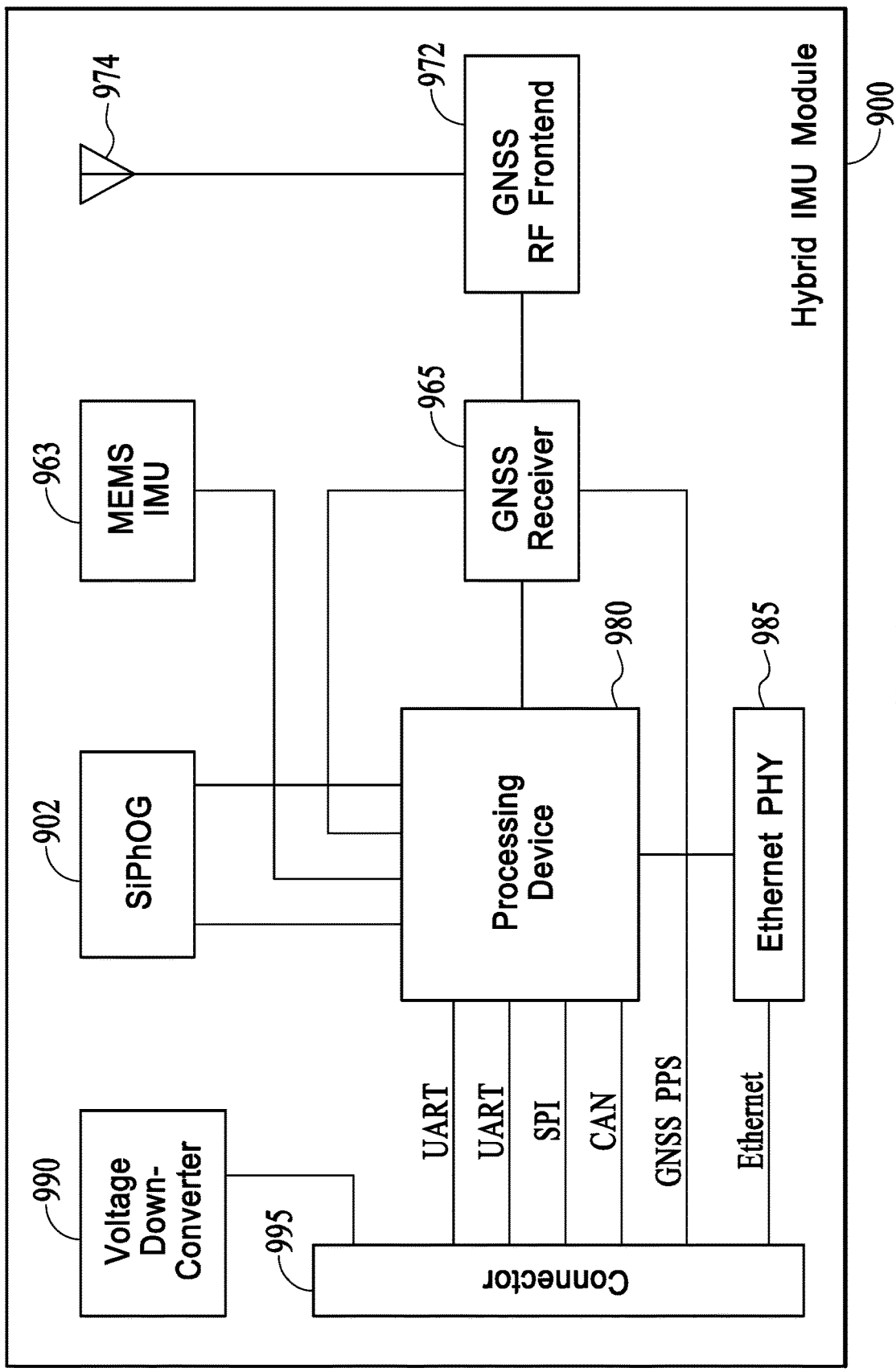
FIG. 9 illustrates hardware architecture of a hybrid IMU module, according to an embodiment of the present disclosure.

FIG. 9 illustrates hardware architecture of a hybrid IMU module 900, according to an embodiment of the present disclosure. The position and trajectory prediction algorithms are processed by processing device 980 (which may be a CPU or a microcontroller). Processing device 980 may have digital signal processing (DSP) blocks, a processing core (such as a RISC processing core), as well as memory and input/output (I/O) blocks. SiPhOG 902 and MEMS IMU 963 send measured data to the processing device 980. GNSS receiver 965 receives satellite data via antenna 974 and radio frequency (RF) front end 972. The hybrid IMU module 900 may support various communication protocols, and accordingly, may have various communication interfaces/circuits/buses, such as Universal Asynchronous Receiver/Transmitter (UART), Serial Peripheral Interface (SPI), Controller Area Network (CAN) bus, etc. Hybrid IMU module 900 may also have Ethernet physical layer (PHY) 985 to support Ethernet protocol. There may be a voltage down-converter block 990 and a connector 995. Pulse Per Second (PPS) signal from the GNSS receiver 965 may be used as benchmark for time synchronization with other sensors, which is crucial for the accuracy of the sensor integration.

In general, the SiPhOG is used in the MEMS IMU module as part of the integrity checking to achieve high levels of safety certification and performance with minimal additional components (i.e., just one SiPhOG might be sufficient).

The SiPhOG can be used to reduce calibration steps, i.e., to remove the need for a separate temperature calibration step (factory or real-time) can be eliminated based on using the low drift of the SiPhOG. Additionally, SiPhOG's low drift and stability can be used to minimize initialization or convergence time.

One or more SiPhOG can be used to reduce temperature related errors in an IMU comprising a mechanical IMU and a GNSS receiver. In other words, the one or more SiPhOG is a reference to fix all 6-axis MEMS IMU's drift, for example, when used with a Kalman Filter, while a vehicle is driven on terrain with even mild slopes. The low drift of SiPhOG can also be used to achieve safe deactivation of a moving vehicle (so called "safe stop") with minimal components and no driver intervention.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense. Additionally, the directional terms, e.g., "top", "bottom" etc. do not restrict the scope of the disclosure to any fixed orientation, but encompasses various permutations and combinations of orientations.

What is claimed is:

1. An inertial measurement unit (IMU) enabling hybrid integration of mechanical and optical components for motion sensing in an autonomous vehicle, the IMU comprising:
    a mechanical module attached to a packaging substrate for providing motion data including low-precision rotational measurement data for three axes of motion; and
    three interchangeable optical gyroscope sub-modules co-packaged with the mechanical module, each optical gyroscope sub-module providing high-precision rotational measurement data for a respective axis of motion among the three axes of motion, wherein each optical gyroscope sub-module is based on integrated photonics;
    wherein a first one of the three optical gyroscope sub-modules is attached on the packaging substrate along a plane of the packaging subject, and, a second one and a third one of the three optical gyroscope sub-modules are attached perpendicularly to the packaging substrate along two different planes orthogonal to each other such that all the three optical gyroscope sub-modules are aligned orthogonal to one another.

2. The IMU of claim 1, wherein the mechanical module comprises micro-electro-mechanical systems (MEMS)-based gyroscopes and accelerometers.

3. The IMU of claim 1, wherein each optical gyroscope sub-module comprises a rotation sensing element, and a front-end chip to launch and receive light into the rotation sensing element of the optical gyroscope.

4. The IMU of claim 3, wherein the rotation sensing element of the optical gyroscope comprises silicon nitride (SiN) based low-loss waveguides.

5. The IMU of claim 4, wherein the SiN-based low-loss waveguides comprise a waveguide coil with a plurality of turns or a micro-resonator ring.

6. The IMU of claim 4, wherein the front-end chip comprises integrated silicon photonics based optical components packaged together with the SiN waveguide rotation sensing element to form a silicon photonics optical gyroscope sub-module attached to the packaging substrate.

7. The IMU of claim 6, further comprising one or more additional silicon photonics optical gyroscope sub-modules for providing redundancy in high-precision rotational measurement for each axis of motion.

8. The IMU of claim 7, wherein the one or more additional silicon photonics optical gyroscope sub-modules are attached directly to the packaging substrate, or vertically stacked on the first silicon photonics optical gyroscope sub-modules that is attached to the packaging substrate for reduction of footprint.

9. The IMU of claim 2, further comprising a processor that executes a sensor fusion algorithm.

10. The IMU of claim 9, wherein inputs for the sensor fusion algorithm include the high-precision rotational measurement data from the optical gyroscope sub-modules, the low-precision motion data from the mechanical module, and data from additional sources.

11. The IMU of claim 10, wherein data from the additional sources includes satellite-based navigation raw data for global positioning.

12. The IMU of claim 10, wherein data from the additional sources include raw data from external sensors.

13. The IMU of claim 12, wherein the external sensors include one or more of: cameras, radars, LIDARs, thermal sensors, and wheel odometers.

14. The IMU of claim 10, wherein the processor executes a Dead Reckoning (DR) algorithm for safe deactivation of motion without driver intervention using high-precision rotational measurement data from the optical gyroscope sub-modules, the low-precision motion data from the mechanical module, and raw data from external sensors when satellite-based navigation raw data for global positioning is not available.

15. The IMU of claim 11, wherein accuracy prediction using satellite-based navigation raw data for global positioning is augmented using data from real-time kinematic (RTK) network.

16. The IMU of claim 9, wherein the processor is coupled to an automotive safety certification module.

17. A method for harnessing enhanced performance from a hybrid IMU including mechanical and optical components for motion sensing in an autonomous vehicle, the method comprising:
    attaching a mechanical module to a packaging substrate, wherein the mechanical module comprises micro-electro-mechanical systems (MEMS)-based gyroscopes and accelerometers for providing motion data including low-precision rotational measurement data for three axes of motion;

co-packaging three interchangeable optical gyroscope sub-modules with the mechanical module, each optical gyroscope sub-module providing high-precision rotational measurement data for a respective axis of motion among the three axes of motion, wherein each optical gyroscope sub-module is based on integrated photonics, and the three optical sub-modules are aligned orthogonal to one another;

calibrating the mechanical module using the high-precision rotational measurement data from the optical gyroscope sub-modules as a reference for correcting drift of the mechanical module for the three axes of motion; and using the high-precision rotational measurement data and calibration results of the mechanical module for obtaining safety certification for the autonomous vehicle using an automotive safety certification module attached to the packaging substrate.

18. The method of claim 17, wherein the optical gyroscope sub-module comprises a silicon photonics optical gyroscope components.

19. The method of claim 18, further comprising:
using the high-precision rotational measurement data from the optical gyroscope sub-modules for safe deactivation of motion without driver intervention irrespective of availability of satellite-based navigation raw data for global positioning.

20. The method of claim 18, calibrating the mechanical module further comprises:
using low drift of the optical gyroscope sub-modules as the reference for eliminating a need for a separate temperature calibration step for the mechanical module.

21. The method of claim 18, wherein the rotation sensing element of each optical gyroscope sub-module comprises silicon nitride (SiN) based low-loss waveguides in the form of a waveguide coil with a plurality of turns or a micro-resonator ring.

22. The method of claim 17, wherein a first one of the three optical gyroscope sub-modules is attached on the packaging substrate along a plane of the packaging subject, and, a second one and a third one of the three optical gyroscope sub-modules are attached perpendicularly to the packaging substrate along two different planes orthogonal to each other such that all the three optical gyroscope sub-modules are aligned orthogonal to one another.

\* \* \* \* \*

UNITED STATES PATENT AND TRADEMARK OFFICE
CERTIFICATE OF CORRECTION

PATENT NO. : 11,656,081 B2
APPLICATION NO. : 17/071697
DATED : May 23, 2023
INVENTOR(S) : Mario Paniccia, Qing Tan and Mike Horton Page 1 of 1

It is certified that error appears in the above-identified patent and that said Letters Patent is hereby corrected as shown below:

In the Claims

In Claim 1, Column 11, Line 64, delete "packaging subject,"

In Claim 1, Column 11, Line 64, insert --packaging substrate,--

Signed and Sealed this
Twenty-seventh Day of June, 2023

Katherine Kelly Vidal
*Director of the United States Patent and Trademark Office*